3,030,389
PROCESSES FOR THE PREPARATION OF
16-ALKYLPREGNENES
Percy L. Julian, Oak Park, Elizabeth Huang, Chicago, and Arthur Magnani, Wilmette, Ill., assignors to The Julian Laboratories, Inc., Franklin Park, Ill., a corporation of Illinois
No Drawing. Filed Jan. 23, 1961, Ser. No. 83,920
7 Claims. (Cl. 260—397.4)

This invention relates to novel processes for the preparation of valuable steroidal compounds. More specifically this invention pertains to novel processes for the preparation of the 16α-methyl derivatives of Compound "S," and the 11-oxygenated analogs thereof.

By virtue of this invention, it is possible to prepare compounds having the follow structural formula:

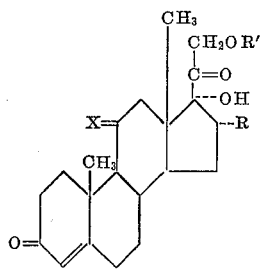

wherein R is lower alkyl of from 1 to 3 carbon atoms, preferably methyl, R' is selected from the group consisting of hydrogen and lower alkanoyl of less than 7 carbon atoms and X is selected from the group consisting of (H,H), (H,OH) and O. These compounds where X embraces hydroxy or keto are the 16α-lower alkyl analogs of cortisone and hydrocortisone. All of the compounds prepared by our novel processes represent valuable intermediates in the preparation of various other 16α-lower alkylpregnenes demonstrating a high order of anti-inflammatory activity, as for example 9α-fluoro-16α-methylprednisolone (dexamethasone).

The method comprised in this process for introduction of the lower alkyl group in the 16α-position and the elaboration of the dihydroxy acetone side chain at $C_{17}$ is substantially that heretofore employed in the art. It has previously been necessary, however, to employ starting materials which are saturated in the A and B ring in order to avoid the occurrence of undesired reactions at these points during the execution of transformations elsewhere in the molecule. Since a double bond at $C_{5(6)}$ greatly facilitates subsequent introduction of unsaturation in the A ring to form a 3-keto-4-monoene or 3-keto-1,4-diene system, it is highly desirable to preserve such a 5(6) double bond when present in the particular starting material employed. Due to the nature of the reactions employed for introduction of the 16α-methyl group and elaboration of the dihydroxy acetone at the side chain $C_{17}$, however, it has heretofore been necessary to start with a compound saturated at $C_{5(6)}$ or remove such a point of unsaturation by hydrogenation prior to synthesis and to completely re-introduce unsaturation in the molecule by means of bromination of a 3-ketopregnane subsequent to 16α-methylation and $C_{17}$ side chain elaboration.

By virtue of this invention it is possible to prepare 16α-methyl Compound "S" and the corresponding 11-oxygenated compounds from the readily available 16-dehydropregnenolone and its 11-oxygenated analogs and to maintain suitable protection for the 5(6) double bond throughout the entire series of reactions. Thus in the case of the 11-desoxy compounds the use of the expensive 3-hydroxy-16-pregnene-20-one as a starting material is avoided and furthermore there is eliminated the necessity for introducing a point of unsaturation in the A ring in a later stage of the procedure by the elaborate procedures heretofore employed.

According to our invention an 11-X-5(6),16-pregnadiene-3-ol-20-one 3-acylate is treated with chlorine so as to form the corresponding 5,6-dichloro compound. Selective introduction of the chlorine atoms at $C_5$ and $C_6$ is effected by employing substantially one equivalent of chlorine. Although the 3-acetate is the preferred ester, other acyl groups such as the benzoate or t-butylacetate are also useful. The resultant 5,6-dichloro-16-pregnene-3-ol-20-one 3-acylate is then subjected to the known reactions required for (1) introduction of the 16α-lower alkyl group, (2) elaboration of the $C_{17}$ dihydroxyacetone side chain and (3) introduction of the oxo group at $C_3$. In this series of reactions, while the methyl, ethyl, or propyl Grignard reagents may be employed, methyl is the preferred species. Removal of the 5,6-dichloro group is then effected by dehalogenation as for example by refluxing with zinc and acetic acid for a period greater than one hour. There is thus formed the 3-keto-4-monoene system as represented by the compound 16α-methyl-4-pregnene-17α,21-diol 3,20-dione-21-lower alkanoate which is readily hydrolyzed by known methods to the intermediates 16α-methyl-4-pregnene-17α,21-diol 3,20-dione (16α-methyl Comopund "S"). These reactions are represented below in FIGURE 1:

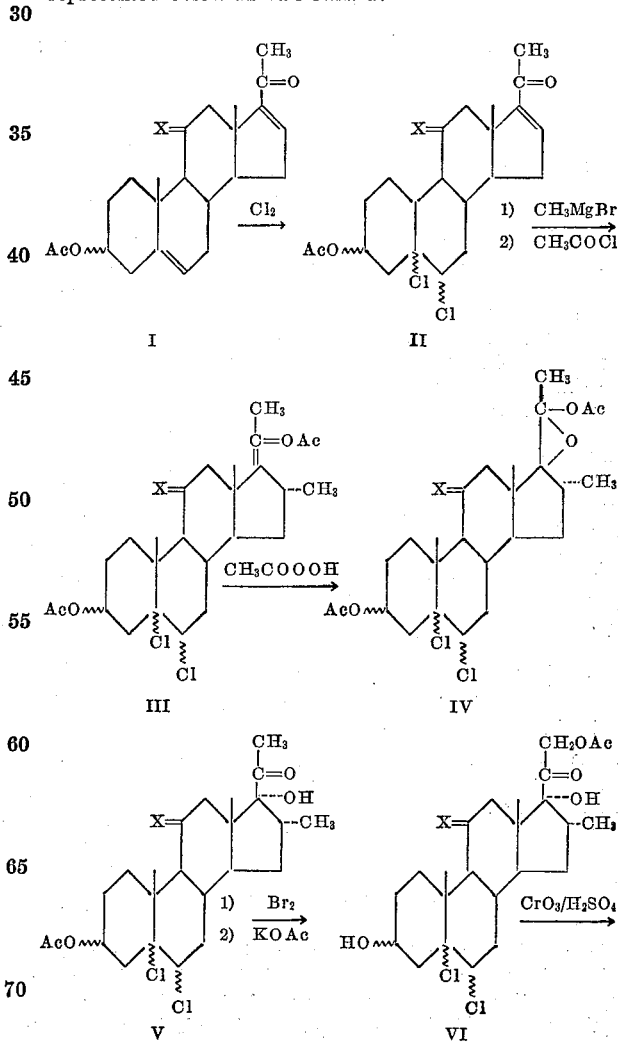

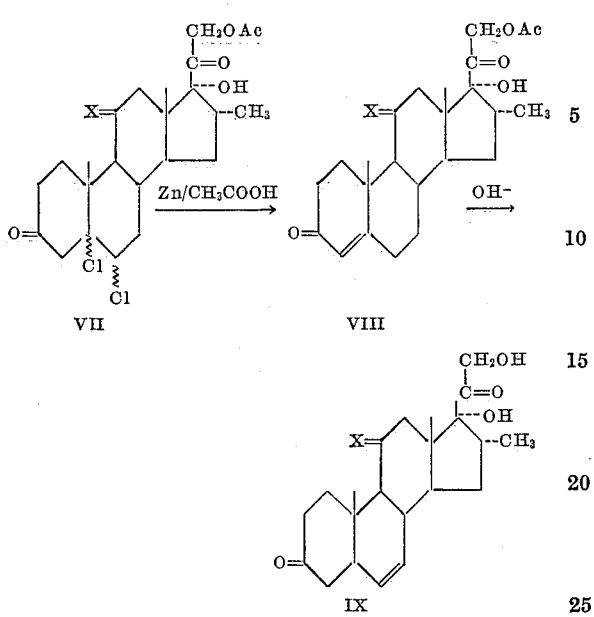

Figure 1

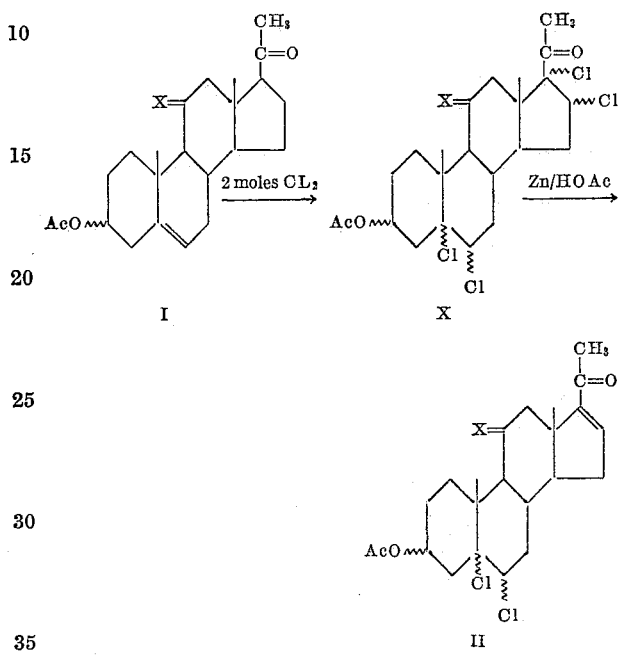

Figure 2 wherein X is as above defined and Ac represents acyl of up to seven carbon atoms, preferably lower alkanoyl of up to seven carbon atoms such as acetyl. The symbol "$\xi$" as herein employed represents either the $\alpha$ or $\beta$ configuration of the group so bound and both configurations are embraced by this invention.

Surprisingly and in contrast to the 5,6-dibromo compound corresponding to II, substantially no reaction at either the 5 or 6 position occurs with the dichloro compound during the Grignard conversion. Hence the 5,6 double bond can be successively protected during the epoxidation reaction at C-17(20) by a group equally inert to the conditions employed during the Grignard reaction. By virtue of our invention, therefore, the dichloro group is initially introduced and the subsequent steps of the Grignard reaction, direct conversion of the Grignard product to the 17(20)-enol acetate without hydrolysis and 17,20-epoxidation can be sequentially executed without the necessity of executing any intermediate steps. In particular while the individual steps of the Grignard reaction, enol-acetylation and epoxidation are similar to those heretofore employed in the preparation of 16-lower alkylpregnenes, our overall process allows for both maintenance of a potential double bond at C–5(6) and direct epoxidation of the 17(20)-enol acetylation product. As described above this 17(20)-enol acetate could not be epoxidized when a 5(6) double bond was present.

As can be seen from the above, this invention also embraces the use of the corresponding 11-oxygenated analogs of 16-dehydropregnenolone. By employing these 11-oxygenated compounds there is also eliminating the necessity for the subsequent introduction of an oxygenated function at $C_{11}$ when such a derivative is desired, as for example, by microbiological methods. Compounds VIII and IX where X embraces hydroxy may be readily transformed to such valuable compounds as 9$\alpha$-fluoro-16$\alpha$-methylprednisolone by known procedures. For example the 1,4-diene system may be introduced by the action of *Corynebacterium simplex* while the 9$\alpha$-fluoro,11$\beta$-hydroxy group is introduced by (1) dehydration to form the 9(11) double bond, (2) epoxidation and (3) cleavage of this 9,11-oxido group with hydrogen fluoride to form the 9$\alpha$-fluoro-11$\beta$-hydroxy group.

In chlorinating 16-dehydropregnenolone acetate, use of substantially one equivalent of chlorine will yield the corresponding 5,6-dichloro compounds (II). When two equivalents of chlorine are employed, there is formed the 5,6,16,17-tetrachloro compound. This compound may be selectively dehalogenated at $C_{16}$ and $C_{17}$ by treatment with zinc and acetic acid at temperatures below 40° C. or with chromous chloride to form the 5,6-dichloro compound, namely 5,6-dichloro-16-pregnene-3-ol-20-one 3-acylate (II) which is employed in the procedure as heretofore described. These reactions are shown in FIGURE 2 below:

Similarly by employing quantities of chlorine which are in excess of one molar equivalent but less than two molar equivalents, a quantity of the tetrachloro compound is formed in addition to the dichloro compound. Use of the selective conditions described above in dechlorinating as with zinc and acetic acid will then yield solely the 5,6-dichloro compound.

This invention, therefore, pertains to a method of protecting the 5,6-double bond of the starting materials for the basic pregnane structure during introduction of the 16$\alpha$-lower alkyl group and 17$\alpha$-hydroxy group as well as further elaboration of the pregnane nucleus, and to reconversion of this protective group to a point of unsaturation in the pregnane nucleus. It will be readily apparent to those skilled in the art that many possible variations can be effected in the known procedure but these variations should not be construed as effecting the fundamental nature of our invention. The following examples will further serve to typify the mode of this invention but should not be construed as limiting the scope thereof, the scope being defined only by the appended claims.

In the following procedures, the 16$\alpha$-lower alkyl group is exemplified by the preferred methyl group and the 3 and 20 acylate group exemplified by the preferred acetate. Other alkyl groups, however, such as for example the ethyl or propyl groups may be introduced in the 16-position by methods known to the art. The lower alkyl-magnesium halide may be either a bromide or an iodide. Similarly, other ester groups such as propionate, t-butyrate, benzoate, succinoate and the like may be employed in place of acetate in the 3,20 or 21 positions.

*Example 1*

A solution of 100 g. of 5(6),16-pregnadiene-3-ol-20-one 3-acetate in 600 ml. of chloroform and 10 ml. of pyridine is cooled with stirring to 0° C. While maintaining the temperature at 0 to 5° C., a solution of 23 g.

of chlorine in 350 ml. of chloroform is added with rapid agitation. The chloroform solution is washed twice with water and then concentrated in vacuo until a thick slurry is obtained. A warm solution of 2 ml. of pyridine in 250 ml. of methanol is added and the mixture is distilled so as to remove about 50 ml. of distillate. The residue is cooled, filtered, washed with cold methanol and dried to yield 5,6-dichloro-16-pregnen-3-ol-20-one 3-acetate, M.P. 150–153°; $[\alpha]_{chloroform} = -32$.

Alternatively a solution of 100 g. of 5,16- pregnadiene-3-ol-20-one acetate in 200 ml. of methylene chloride and 10 ml. of pyridine is stirred and cooled to 0° C. A solution of 37 g. of chlorine in 600 ml. of methylene chloride is added from 0 to 5° C. After adding 100 ml. of acetic acid, the solution is treated with zinc dust, allowing the temperature to rise to 20–25° C. Stirring is continued at this temperature for 20 minutes. The solution is decanted from the remaining zinc dust and washed with water, aqueous sodium bicarbonate, and water. After adding 5 ml. of pyridine, the solution is concentrated in vacuo to a thick slurry, 250 ml. of warm methanol are added and the mixture then distilled until distillate is free of methylene chloride. The slurry is cooled, filtered, washed with cold methanol and dried to yield 5,6-dichloro-16-pregnene-3-ol-20 - one 3 - acetate, properties as above.

*Example 2*

(A) To a solution of 100 g. of 5,16-pregnadiene-3-ol-20-one 3-acetate in 200 ml. of methylene chloride is added with stirring a solution of 42 g. of chlorine in 600 ml. of methylene chloride, maintaining a temperature between 0 to 5° C. After completion of the addition, excess chlorine (as indicated by a positive KI-starch test) is then decomposed by addition of an aqueous solution of sodium bisulfite. The methylene chloride solution is then washed with water and 5 ml. of pyridine are added. The solution is concentrated in vacuo and crystallized from methanol to obtain 5,6,16,17-tetrachloro-pregnane-3-ol-20-one 3-acetate, M.P. 209–214° dec.; $[\alpha]_{chloroform} = +15$.

(B) Fifty grams of the tetrachloro compound prepared in part A of this example are dissolved in 200 ml. of methylene chloride and 50 ml. of acetic acid. The solution is treated while stirring with an excess of zinc dust at temperatures of 25–30° C. and stirred for 10 minutes after the exothermic reaction is over. The solution is filtered to remove the zinc dust, washed with water, aqueous sodium bicarbonate, and water. After the addition of 2 ml. of pyridine the solution is concentrated in vacuo to a thick slurry. A solution of 1 ml. of pyridine in 100 ml. of methanol is added and the mixture is concentrated to remove the methylene chloride. After cooling, filtering, washing with methanol, and drying there is obtained 5,6-dichloro-16-pregnene-3-ol-20-one 3-acetate, properties as in Example 1.

*Example 3*

A solution of 357 g. (3 moles) of methylmagnesium bromide in 300 ml. of ether is added to a stirred mixutre of 15 g. of cuprous chloride in 500 ml. of tetrahydrofuran at 10–15° C. A solution of 100 g. of 5,6-dichloro-16-pregnene-3-ol-20-one 3-acetate is next added, maintaining the temperature from 10 to 20° C. The temperature of the mixture is allowed to reach 20 to 25° C. and the mixture stirred for a period of 2 hours. The mixture is then cooled and 80 ml. of acetyl chloride in 100 ml. of benzene is added, maintaining a temperature below 20° C. during the addition and allowing the solution to stir for one hour at room temperature. This mixture is poured into a solution of 50 g. of ammonium chloride in 600 ml. of ice water and stirred for several minutes. The mixture is extracted with benzene and washed five times with water. The benzene solution is dried over sodium sulfate, filtered and then concentrated in vacuo to an oil consisting essentially of 5,6-dichloro-16α-methyl-17-pregnene-3,20-diol 3,20-diacetate.

This enol acetate is then dissolved in 900 ml. of chloroform and 150 ml. of acetic acid and the resultant solution is cooled to 10 to 15° C. Concurrently a solution is prepared of 45 g. of sodium acetate trihydrate in 133 ml. of 40% peracetic acid. This solution is then added to the methylene chloride-acetic acid solution of the enol acetate and the mixture stirred with cooling for two hours. The mixture is then stirred overnight at room temperature. After diluting with water, the solution is extracted with methylene chloride and these extracts washed with water, 10% aqueous sodium hydroxide and finally with water until neutral. The washed methylene chloride solution is concentrated in vacuo to a residue which is dissolved in 600 ml. of methanol and then hydrolyzed by the addition with stirring of a solution of 33 g. of sodium hydroxide in 200 ml. of water. The slurry which forms is stirred for one to two hours and, after neutralizing with acetic acid, filtered, washed with 65% aqueous methanol and dried to yield 5,6-dichloro-16α-methylpregnan-3,17α-diol-20-one 3-acetate, M.P. 207–212°.

*Example 4*

A solution of 100 g. of 5,6-dichloro-16α-methylpregnan-3-17α-diol-20-one 3-acetate in 800 ml. of chloroform and 20 ml. of methanol is warmed to 30° C. and treated by the addition of a solution of 42 g. of bromine in 200 ml. of chloroform. A portion of the bromine solution is first added and the mixture stirred at 30 to 35° C. until reaction is evident. The remaining bromine solution is then added as rapidly as possible without excess bromine being present at any time. Upon completion of the addition, the solution is stirred for 5 minutes. A solution of 50 g. of sodium bicarbonate in 300 ml. of water is then added slowly and the mixture stirred vigorously for 30 minutes. The layers are separated and the methylene chloride solution washed with water and concentrated in vacuo to a volume of about 150 ml. Two hundred and fifty milliliters of ether are added and the solution is then refluxed for 10 minutes. Upon cooling, filtering and drying, there is obtained 5,6-dichloro-16α-methyl-21-bromopregnan-2,17α-diol-20-one 3-acetate, M.P. 182–185° dec.

*Example 5*

A mixture of 100 g. of the 21-bromo derivative prepared in Example 4 and 200 g. of potassium acetate in 1500 ml. of acetone and 3 ml. of acetic acid is stirred at reflux for 4 hours. The acetone is removed in vacuo and water is then added. The solution is extracted with methylene chloride and these extracts washed with water. The methylene chloride solution is concentrated until crystallization is evident, at which point ether is added and the solution further concentrated. There is thus obtained 5,6-dichloro-16α-methylpregnan-3,17α,21-triol-20-one 21-acetate, M.P. 185–188°.

Alternatively other alkali metal acylates such as sodium propionate, potassium benzoate and the like may be employed in this procedure to obtain the corresponding 21-acylates.

*Example 6*

A solution of 100 g. of 5,6-dichloro-16α-methylpregnane-3β,17α,21-triol-20-one 21-acetate in 3300 ml. of acetone is cooled to 5° C. and there is added with rapid stirring over 10 minutes 60 ml. of an aqueous solution of 16 g. of chromium trioxide and 13.8 ml. of concentrated sulfuric acid. After addition, the mixture is stirred for 10 minutes, allowing the temperature to rise to 15° C. The excess chromic acid solution is decomposed by adding 20 ml. of a saturated sodium bisulfite solution. There is next added 50 g. of sodium bicarbonate, 50 g. of sodium sulfate, and 30 g. of Celite and the mixture stirred for 5 minutes. The mixture is then filtered through Celite and washed with warm acetone. The acetone solution is concentrated in vacuo to a residue which is slurried in ether, filtered, and dried to yield 5,6-dichloro-16α-methylpregnane-17α,21-diol-3,20-dione 21-acetate, M.P. 171–174° dec.

*Example 7*

A mixture of 100 g. of 5,6-dichloro-16α-methylpregnane-17α,21-diol-3,20-dione 21-acetate and 25 g. of zinc dust in 1000 ml. of methylene chloride and 200 ml. of acetic acid is stirred at reflux for 2 hours. The solution is filtered and washed with water, aqueous sodium bicarbonate solution, and water. The methylene chloride is removed by concentration and the residue dissolved in 500 ml. of acetone. This solution is concentrated and cooled and the solid so formed collected by filtration, washed with cold acetone and dried to yield 16α-methyl-4-pregnene-17α,21-diol-3,20-dione 21-acetate, M.P. 160–165°.

*Example 8*

A solution of 100 g. of 16α-methyl-4-pregnene-17α,21-diol-3,20-dione 21-acetate in 400 ml. of methylene chloride and 600 ml. of methanol is stirred at 20° C. and flushed with nitrogen. A solution of 6 g. of potassium hydroxide in 200 ml. of methanol is then added. The mixture is stirred for 10 minutes and then allowed to stand for 30 minutes at 25° C. The solution is neutralized by addition of acetic acid and diluted to 3000 ml. by addition of water. The solution is extracted with methylene chloride, washed with water, and concentrated to the point of crystallization. Ether is then added (500 ml.) and concentration continued until a thick slurry results. This slurry is cooled, filtered, washed with ether and dried to yield 16α-methyl-4-pregnene-17α,21-diol-3,20-dione, M.P. 188–190°, [α]$_{chloroform}$=+10; E$_{max}$ (241 mμ)=16,200.

*Example 9*

A solution of 104 g. of 5(6),16-pregnadiene-3-ol-11,20-dione 3-acetate in 600 ml. of chloroform and 10 ml. of pyridine is treated in the manner of Example 1. Upon completion of the procedure as therein described there is obtained 5,6-dichloro-16-pregnene-3-ol-11,20-dione 3-acetate.

Treatment of 5,6-dichloro-16-pregnene-3-ol-11,20-dione 3-acetate with methylmagnesium bromide followed by treatment with acetyl chloride in the manner described in Example 3 then yields 5,6-dichloro-16α-methyl-17-pregnene-3,20-diol-11-one 3,20-diacetate. This compound is treated with peracetic acid also according to the procedure of Example 3 and the product hydrolyzed as therein described to yield 5,6-dichloro-16α-methyl-pregnane-3,17α-diol-11,20-dione 3-acetate.

Bromination of this compound according to the procedure of Example 4 then yields 5,6-dichloro-16α-methyl-21-bromopregnane-3,17α-diol-11,20-dione 3-acetate which is treated with potassium acetate as described in Example 5 to yield 5-6-dichloro-16α-methylpregnane-3,17α,21-triol-11,20-dione 21-acetate.

Oxidation of this compound as described in Example 6 then yields 5,6-dichloro-16α-methylpregnane-17α,21-diol-3,11,20-trione 21-acetate.

One hundred grams of 5,6-dichloro-16α-methylpregnane-17α,21-diol-3,11,20-trione 21-acetate is combined with 25 g. of zinc dust in 1000 ml. of methylene chloride and 200 ml. of acetic acid and the mixture stirred at reflux for 2 hours. The solution is then filtered, washed with water, aqueous sodium bicarbonate solution, and water. The solution is then dried and distilled in vacuo to remove the excess methylene chloride. The residue so obtained is dissolved in 500 ml. of acetone and the resultant solution concentrated to a residue which is collected upon drying by filtration, washed with cold actone and dried to yield 16α-methyl-4-pregnene-17α,21-diol-3,11,20-trione 21-acetate.

*Example 10*

By employing 5(6),16-pregnadiene-3,11β-diol-20-one 3-acetate in place of 3-hydroxy-5(6),16-pregnadiene-11,20-dione 3-acetate in the initial procedure of Example 9, there is obtained the compound 5,6-dichloro-16-pregnene-3,11β-diol-20-one 3-acetate. The remaining procedures described in Example 9 are then sequentially executed, penultimately obtaining the compound 5,6-dichloro-16α-methylpregnene-11β,17α,21-triol-3,20-dione 21-acetate which is dehalogenated as described in Example 9 to yield 16α-methyl-4-pregnene-11β,17α,21-triol-3,20-dione 21-acetate.

We claim:

1. In the process for the preparation of compounds having the formula:

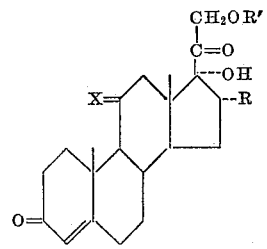

wherein

X is a member selected from the group consisting of (—H,—H), (—H,β—OH) and (=O);

R' is a member selected from the group consisting of hydrogen and lower alkanoyl; and R is a lower alkyl in which R is introduced by treatment of a 20-keto-16-pregnene with R-magnesium bromide, the 17α-hydroxy group is introduced by formation of a 20-enol acetate, subsequent 17α,20-epoxidation and hydrolysis of the resultant 17α,20-epoxide, a lower alkanoyloxy group at C-21 is introduced by bromination at C-21 and treatment of the 21-bromo compound with an alkali metal lower alkanoate; and the 3-keto group is introduced by oxidizing a 3-hydroxyl group; the steps which comprise:

(*a*) treating prior to said introduction of R, a compound of the formula:

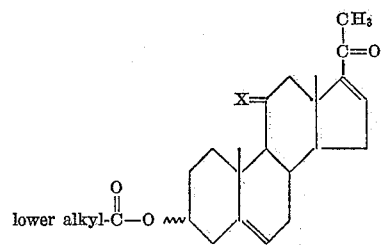

wherein X is as above defined, with a substantially equimolar quantity of chlorine in a non-aqueous inert organic solvent so as to selectively introduce chlorine atoms at C-5 and C-6, and (*b*) removing said chlorine atoms at C-5 and C-6 by treatment with zinc and acetic acid subsequent to said introduction of said R, said introduction of said 17α-hydroxyl group, said introduction of said 21-lower alkanoyloxy group, and said oxidation of said 3-hydroxy group to said 3-keto group.

2. The process according to claim 1 wherein X is (—H,—H).

3. The process according to claim 1 wherein said non-aqueous organic solvent is a halogenated lower alkane.

4. The process for the preparation of a compound having the formula:

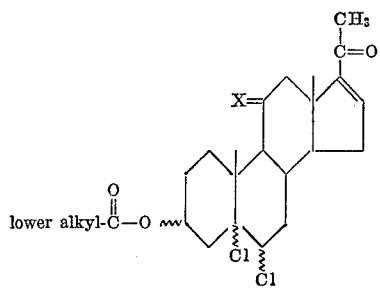

wherein X is a member selected from the group consisting of (—H,—H), (—H,β—OH) and (=O) which comprises treating an 11-X-5,16-pregnadiene-3-ol-20-one 3-lower alkanoate with a substantially equimolar quantity of chlorine in a non-aqueous inert organic solvent so as to selectively introduce chlorine atoms at C–5 and C–6.

5. The process for the preparation of 11-X-5,6-dichloro-16-pregnene-3-ol-20-one 3-acylate wherein X is selected from the group consisting of (hydrogen, hydrogen), (hydrogen, β-hydroxyl) and oxo which comprises reacting at 11-X-5(6),16-pregnadiene-3-ol-20-one 3-acylate with an excess over one molar equivalent of chlorine in a non-aqueous inert organic solvent so as to form a reaction product of polychlorinated pregnanes comprising 11-X-5,6,16,17-tetrachloropregnane-3-ol-20-one 3-acylate and treating said 11-X-5,6,16,17-tetrachloropregnane-3-ol-20-one 3-acylate with zinc and acetic acid for a period less than 30 minutes and at a temperature below 40° C., thereby forming 11-X-5,6-dichloro-16-pregnene-3-ol-20-one 3-acylate.

6. The process according to claim 5 wherein said excess over one molar equivalent of chlorine is at least one molar equivalent, the total quantity of reactable chlorine thereby being at least two molar equivalents.

7. The process according to claim 5 characterized in that said reaction product of polychlorinated pregnanes comprises a mixture of 11-X-5,6,16,17-tetrachloropregnane-3-ol-20-one 3-acylate and 11-X-5,6-dichloro-16-pregnene-3-ol-20-one 3-acylate and further characterized in said mixture is treated with zinc and acetic acid for a period less than 30 minutes and at a temperature less than 40° C. whereby the resultant reaction product consists essentially of 11-X-5,6-dichloro-16-pregnene-3-ol-20-one 3-acylate.

References Cited in the file of this patent
UNITED STATES PATENTS 2,884,417    Cutler et al.    Apr. 28, 1959
2,970,157    Cutler et al.    Jan. 31, 1961